US011551183B2

(12) United States Patent
Cacioppo et al.

(10) Patent No.: US 11,551,183 B2
(45) Date of Patent: Jan. 10, 2023

(54) SYSTEMS AND METHODS FOR MANAGING EXCEPTIONS TO ORDERS COLLECTED BY AUTONOMOUS VEHICLES

(71) Applicant: 6 River Systems, LLC, Waltham, MA (US)

(72) Inventors: Christopher Cacioppo, Somerville, MA (US); Alexa Mellon, Cambridge, MA (US); Matthew Graham, Millis, MA (US); Jeffrey Kreis, Wolfeboro, NH (US); Christopher Payne, Cambridge, MA (US); Timothy Deignan, Watertown, MA (US)

(73) Assignee: 6 River Systems, LLC, Waltham, MA (US)

( * ) Notice: Subject to any disclaimer, the term of this patent is extended or adjusted under 35 U.S.C. 154(b) by 0 days.

(21) Appl. No.: 17/027,479

(22) Filed: Sep. 21, 2020

(65) Prior Publication Data

US 2022/0092541 A1  Mar. 24, 2022

(51) Int. Cl.
*G06Q 10/08* (2012.01)
*G05D 1/02* (2020.01)
(Continued)

(52) U.S. Cl.
CPC ..... *G06Q 10/08355* (2013.01); *G05D 1/0287* (2013.01); *G06Q 10/06315* (2013.01); *G06Q 50/28* (2013.01)

(58) Field of Classification Search
CPC .......... G06Q 101/08355; G06Q 50/28; G06Q 10/06315; G05D 1/0287
(Continued)

(56) References Cited

U.S. PATENT DOCUMENTS 8,892,241 B2    11/2014  Weiss
9,786,187 B1 *  10/2017  Bar-Zeev ............. G08G 5/0034
(Continued)

FOREIGN PATENT DOCUMENTS

WO    2019217420    11/2019
WO    2020257389    12/2020

OTHER PUBLICATIONS

Crowe, Steve; "OTTO Boston Dynamics Handle demo future of warehouse robotics"; Mar. 3, 2020. (Year: 2020).*

*Primary Examiner* — Resha Desai
*Assistant Examiner* — Dione N. Simpson
(74) *Attorney, Agent, or Firm* — Hanley, Flight & Zimmerman, LLC

(57) ABSTRACT

Disclosed herein are systems and methods for managing exceptions to orders collected by autonomous vehicles. The exemplary systems may be configured to receive an indication of an exception that at least one item for an order cannot be collected with a first autonomous vehicle carrying a container associated with the order and determine a reconfigured path for the first vehicle responsive to receiving the indication of the exception. The reconfigured path may include a stop at a storage location configured to store containers associated with the exception. The systems may be configured to receive an indication that the container was removed from the first vehicle and deposited at the storage location, transmit an instruction to a second autonomous vehicle to collect the at least one item for the order, and receive an indication that the at least one item has been matched with the container deposited at the storage location.

20 Claims, 9 Drawing Sheets

(51) Int. Cl.
*G06Q 10/06* (2012.01)
*G06Q 50/28* (2012.01)

(58) Field of Classification Search
USPC .......................................................... 705/338
See application file for complete search history.

(56) References Cited

U.S. PATENT DOCUMENTS

| | | | |
|---|---|---|---|
| 9,813,510 B1* | 11/2017 | Nickels | H04L 67/18 |
| 9,834,380 B2 | 12/2017 | Hamilton et al. | |
| 10,241,516 B1* | 3/2019 | Brady | G05D 1/0297 |
| 2014/0365258 A1 | 12/2014 | Vestal et al. | |
| 2017/0220983 A1* | 8/2017 | Pellow | G06F 16/29 |
| 2018/0130017 A1* | 5/2018 | Gupte | G01N 33/00 |
| 2019/0325376 A1* | 10/2019 | Khasis | G08G 1/0133 |
| 2019/0367278 A1* | 12/2019 | Bellar | G06Q 50/28 |
| 2020/0130510 A1* | 4/2020 | Eck | G08G 5/0034 |
| 2020/0241564 A1* | 7/2020 | Goldman | G06Q 50/30 |
| 2020/0281384 A1* | 9/2020 | Ruben | A47G 29/20 |
| 2020/0302391 A1 | 9/2020 | Li et al. | |
| 2020/0310391 A1 | 10/2020 | Cole et al. | |
| 2020/0372464 A1* | 11/2020 | Kim | G06Q 30/0635 |
| 2021/0049037 A1 | 2/2021 | Kattepur et al. | |
| 2021/0158270 A1* | 5/2021 | Singh | B66F 9/063 |
| 2021/0198041 A1* | 7/2021 | Austrheim | B65G 63/06 |

* cited by examiner

SYSTEMS AND METHODS FOR MANAGING EXCEPTIONS TO ORDERS COLLECTED BY AUTONOMOUS VEHICLES

TECHNICAL FIELD

The following disclosure is directed to systems and methods for inventory management and order collection by autonomous vehicles and, more specifically, systems and methods for managing exceptions to orders collected by autonomous vehicles.

BACKGROUND

Inventory management systems are typically configured to manage customer orders for products in a warehouse or a store. Warehouses can be arranged such that human pickers and/or autonomous vehicles can access and collect items for orders in an efficient manner. Customer orders can include orders by individual purchasers with single-packaged items or orders by businesses with bulk packaged items (e.g., multiple items packaged together).

SUMMARY

In one aspect, the disclosure features a computing system for managing exceptions to orders collected with autonomous vehicles. The computing system can include a communication device configured to receive an indication of an exception that at least one item for an order cannot be collected with a first autonomous vehicle carrying a container associated with the order, and a processor in electrical communication with the communication device and configured to determine a reconfigured path for the first vehicle responsive to receiving the indication of the exception. The reconfigured path can include a stop at a storage location configured to store containers associated with the exception. The communication device can be further configured to: receive an indication that the container was removed from the first vehicle and deposited at the storage location; transmit an instruction to a second autonomous vehicle to collect the at least one item for the order; and receive, via a network, an indication that the at least one item has been matched with the container deposited at the storage location.

Various embodiments of the computing system may include one or more of the following features. The communication device can be further configured to receive an indication of an exception that at least one item for an order cannot be collected for each of a plurality of autonomous vehicles. The plurality of autonomous vehicles can include the first autonomous vehicle. The communication device, in transmitting the instruction to the second autonomous vehicle, can be further configured to transmit an instruction to collect the at least one item for the order of each of the plurality of autonomous vehicles. The indication of the exception can include at least one of: (i) an indication that the at least one item is not present at a location assigned to the item; (ii) an indication that the at least one item is damaged; (iii) an indication that the at least one item has an unscannable barcode; (iv) an indication that the container lacks space to hold the at least one item; (v) an indication that the at least one item is located on a different floor from the first vehicle; or (vi) an indication that the first vehicle cannot obtain the at least one item. The communication device can be further configured to receive the indication of the exception via (i) a user interface coupled to the first vehicle, (ii) a sensor of the first vehicle, (iii) a computing system of the first vehicle, or (iv) a computing system remote from the first vehicle. The communication device can be further configured to (i) receive the indication that the container was removed from the first vehicle and deposited at the storage location at a first time and (ii) transmit the instruction to the second autonomous vehicle to collect the at least one item for the order at a second time different from the first time. The second time can occur at or after a determination that the at least one item for the order can be collected. The computing system can be remote from the first and second autonomous vehicles. The storage location can include lighting for facilitating the matching of the at least one item with the container deposited at the storage location. The communication device, prior to transmitting the instruction to the second autonomous vehicle to collect the at least one item for the order, can be further configured to receive an indication that an inventory count for the at least one item has increased.

In another aspect, the disclosure features a computer-implemented method for managing exceptions to orders collected with autonomous vehicles. The method can include receiving, by a communication device of a computing system, an indication of an exception that at least one item for an order cannot be collected with a first autonomous vehicle carrying a container associated with the order, and determining, by a processor of the computing system, a reconfigured path for the first vehicle responsive to receiving the indication of the exception, the reconfigured path including a stop at a storage location configured to store containers associated with the exception. The method can further include receiving, by the communication device, an indication that the container was removed from the first vehicle and deposited at the storage location; transmitting, by the communication device, an instruction to a second autonomous vehicle to collect the at least one item for the order; and receiving, by the communication device, an indication that the at least one item has been matched with the container deposited at the storage location.

Various embodiments of the computer-implemented method may include one or more of the following features. The indication of an exception that at least one item for an order cannot be collected is received for each of a plurality of autonomous vehicles, in which the plurality of autonomous vehicles includes the first autonomous vehicle. Transmitting the instruction to the second autonomous vehicle can include transmitting an instruction to collect the at least one item for the order of each of the plurality of autonomous vehicles. The indication of the exception can include at least one of: (i) an indication that the at least one item is not present at a location assigned to the item; (ii) an indication that the at least one item is damaged; (iii) an indication that the at least one item has an unscannable barcode; (iv) an indication that the container lacks space to hold the at least one item; (v) an indication that the at least one item is located on a different floor from the first vehicle; or (vi) an indication that the first vehicle cannot obtain the at least one item. The indication of the exception is received via (i) a user interface coupled to the first vehicle, (ii) a sensor of the first vehicle, (iii) a computing system of the first vehicle, or (iv) a computing system remote from the first vehicle.

Receiving the indication that the container was removed from the first vehicle and deposited at the storage location can occur at a first time and transmitting the instruction to the second autonomous vehicle to collect the at least one item for the order occurs at a second time different from the first time. The second time can occur at or after determining that the at least one item for the order can be collected. The method can be executed by a computing system remote from the first and second autonomous vehicles. Prior to transmitting the instruction to the second autonomous vehicle to collect the at least one item for the order, the method can further include receiving an indication that an inventory count for the at least one item has increased.

In another aspect, the disclosure features a non-transitory computer-readable medium having instructions stored thereon that, when executed by one or more computer processors, cause the computer processors to perform operations. The operations can include receiving an indication of an exception that at least one item for an order cannot be collected with a first autonomous vehicle carrying a container associated with the order, and determining a reconfigured path for the first vehicle responsive to receiving the indication of the exception. The reconfigured path can include a stop at a storage location configured to store containers associated with the exception. The operations can further include receiving an indication that the container was removed from the first vehicle and deposited at the storage location; transmitting an instruction to a second autonomous vehicle to collect the at least one item for the order; and receiving an indication that the at least one item has been matched with the container deposited at the storage location.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the systems and methods described herein. In the following description, various embodiments are described with reference to the following drawings.

DETAILED DESCRIPTION

Exceptions to customer orders can include instances in which an inventory item is out of stock, is damaged, or cannot be collected by the autonomous vehicle for one or more reasons. Such exceptions may require significant resources to resolve and may therefore cause backlogs in fulfilling customer orders. For example, additional resources may be needed in organizing exceptions in parallel with existing and/or new customer orders. Exceptions may be challenging to address in automated warehouses that rely on quick processing of customer orders with autonomous vehicles. In some cases, exceptions may require that warehouse operations be paused entirely to address such exceptions.

Described herein are exemplary systems and methods for managing exceptions to orders collected by autonomous vehicles. In the various embodiments described herein, one or more autonomous vehicles can carry containers (also referred as "totes") to hold one or more items for a customer order. In some cases, a container can be associated with an exception (e.g., missing items, the container being too small to carry the ordered item(s), etc.). One or more autonomous vehicles can be re-routed to a location configured to store such containers (or the items therein) until the order can be completed. In some instances, an exception can be cured by navigating one or more autonomous vehicles to collect outstanding items to complete one or more customer orders. One advantage of the exemplary systems and methods described herein is that outstanding items can be batched together by a computing system to generate new picklists for autonomous vehicles. These new picklists can be integrated into the regular workflow of the automated warehouse operation, thereby reducing or preventing inefficiencies caused by exceptions.

The technology described herein may be employed in mobile carts of the type described in, for example, U.S. Pat. No. 9,834,380, issued Dec. 5, 2017 and titled "Warehouse Automation Systems and Methods," the entirety of which is incorporated herein by reference and described in part below.

Exemplary Application to Autonomous Warehouse Carts

Figure 1A:
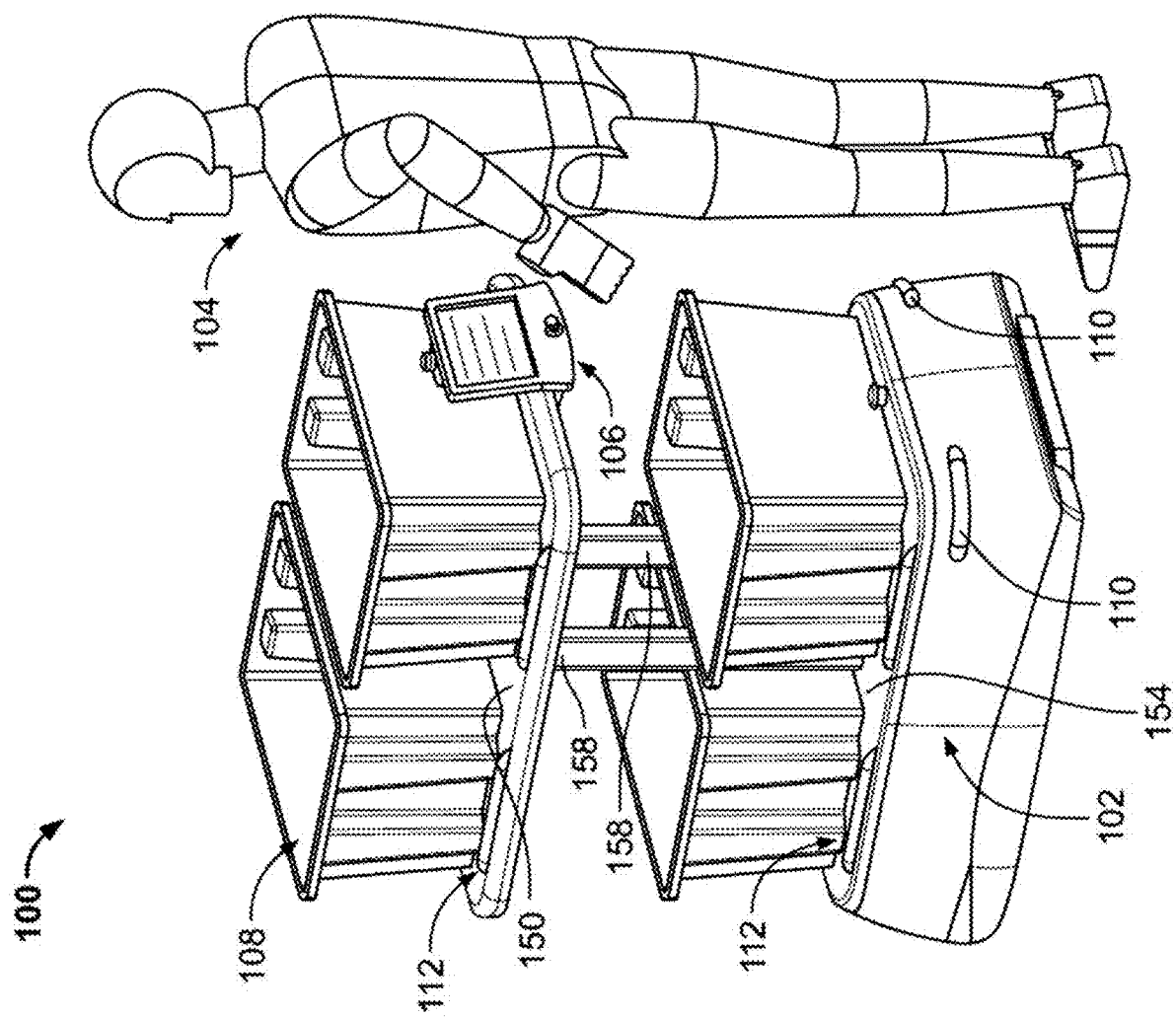
FIG. 1A is a model of an embodiment of an autonomous vehicle configured to collect orders.

FIG. 1A depicts an enhanced cart system 100 including an enhanced cart 102 (e.g., an autonomous vehicle). As illustrated, one or more enhanced carts, often referred to in the industry as picking carts, can work alongside one or more warehouse workers 104 (also referred to as associates) to move inventory items around a warehouse. The enhanced carts 102 are intended to assist in most warehouse tasks, such as picking, re-stocking, moving, sorting, counting, or verifying items (e.g., products). These carts 102 can display information to the associate 104 through the use of a user interface (e.g., screen) 106 and/or onboard visual and/or audible indicators that improve the performance of the associates 104. The cart 102 can be propelled by a motor (e.g., an electric motor) that is coupled to a power source (e.g., a battery, a supercapacitor, etc.), such that the cart 102 moves autonomously and does not require being pushed or pulled by a human or other force. The cart 102 may travel to a charging area to charge its battery or batteries.

Referring still to FIG. 1A, the enhanced carts 102 may be configured to carry one or many similar or distinct storage containers 108, often in the form of totes or boxes, that can be used to hold one or more different products. These storage containers 108 may be removable from the enhanced cart 102. In some cases, each container 108 can be used as a separate picking location (i.e., one container 108 is a single order). In other cases, the containers 108 can be used for batch picking (i.e., each container 108 can contain multiple complete or partial orders). Each container 108 may be assigned to one or many different stations for post-pick sortation and processing. In one embodiment, one or more of the containers 108 are dedicated to batch picking of multiple types of products and another one or more containers 108 are dedicated to picking multiple quantities of a single product (e.g., for orders that only have one item). This singleton picking allows the warehouse to skip secondary sortation and deliver products directly to a packaging station. In another embodiment, one or more of the containers 108 are assigned to order picking (e.g., for potentially time sensitive orders) and one or more of the containers 108 are assigned to batch picking (e.g., for lower cost or less time sensitive orders). In yet another embodiment, one or more of the containers 108 carry product that will be used to re-stock product into storage locations. Another option is for the enhanced cart 102 to move product and/or shipments throughout the warehouse as needed between different stations, such as packing and shipping stations. In yet another implementation, one or more of the containers 108 is left empty to assist in counting product into and then back out of the container 108 as part of a cycle count task regularly carried out in warehouses for inventory management. The tasks may be completed in a mode dedicated to one task type or interleaved across different task types. For example, an associate 104 may be picking products into container "one" on the enhanced cart 102 and then be told to grab products from container "two" on the enhanced cart 102 and put them away in the same aisle.

Figure 1B:
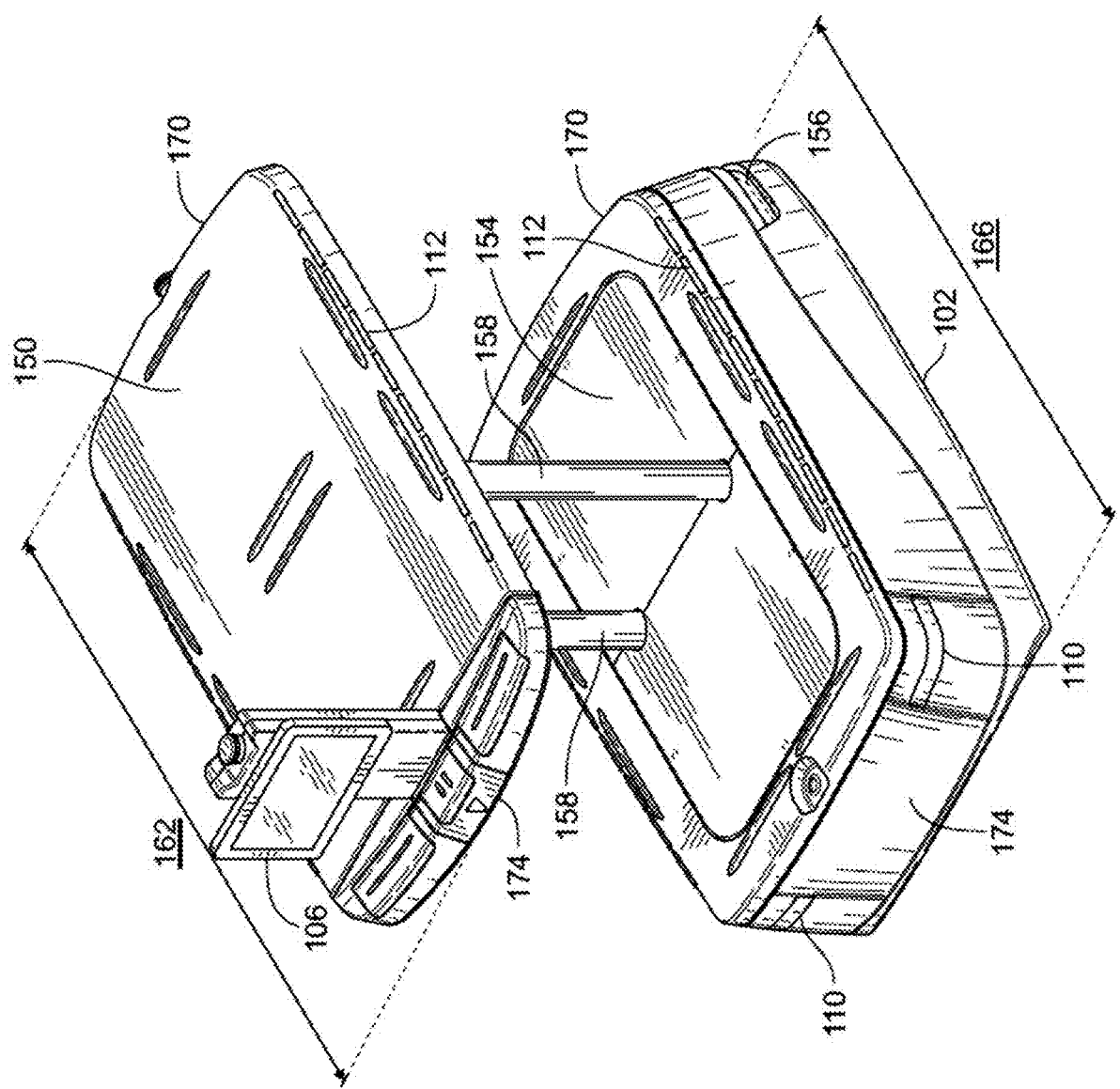
FIG. 1B is a model of another embodiment of an autonomous vehicle configured to collect orders.

FIG. 1B is an alternative embodiment of the enhanced cart 102, and is shown (for ease of understanding) without the storage containers 108 being present. As before, the enhanced cart 102 includes the screen 106 and lighting indicators 110, 112. In operation, the storage containers 108 may be present on the enhanced cart 102 depicted in FIG. 1B. With reference to both FIGS. 1A and 1B, the enhanced cart 102 may include first and second platforms 150, 154 for supporting a plurality of containers 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, in guiding workers around the floor of a warehouse and carrying inventory or customer orders for shipping. However, autonomous vehicles of any type can be used in many different settings and for various purposes, including but not limited to: driving passengers on roadways, delivering food and medicine in hospitals, carrying cargo in ports, cleaning up waste, etc. This disclosure, including but not limited to the technology, systems, and methods described herein, is equally applicable to any such type of autonomous vehicle.

Exceptions to Orders

As discussed above, in a warehouse setting (or in a retail store, a grocery store, etc.), an autonomous vehicle 102 can be tasked with collecting one or more items distributed in various locations in the warehouse for one or more customer orders. In some instances, an item may not be found at its intended location, be out of stock, be damaged, have an unscannable barcode, etc. In other instances, one or more containers 108 of the autonomous vehicle 102 may be too full with other items, may be too small for a particular item, may need to be batched with other containers (e.g., from other parts of the warehouse, another warehouse floor, etc.) to complete an order. In yet other instances, certain items may be too large or too heavy for a particular type of container and/or autonomous vehicle to carry (and therefore may require a different container and/or different vehicle to accommodate the item). In yet other instances, the vehicle 102 may be temporarily prevented from obtaining the item (e.g., the item is placed too high or inaccessible for another reason) or prevented from accessing certain areas in an inventory area (e.g., due to a spillage or construction in a particular aisle of the warehouse).

These instances may be referred to as "exceptions" and can create challenges to efficiently fulfilling a customer order. The containers associated with exceptions (e.g., containers with missing items, containers too full to carry a complete order, etc.) may be referred herein as "shorted" containers or totes.

Systems and Methods for Managing Exceptions—Directing Exceptions

Figure 2:
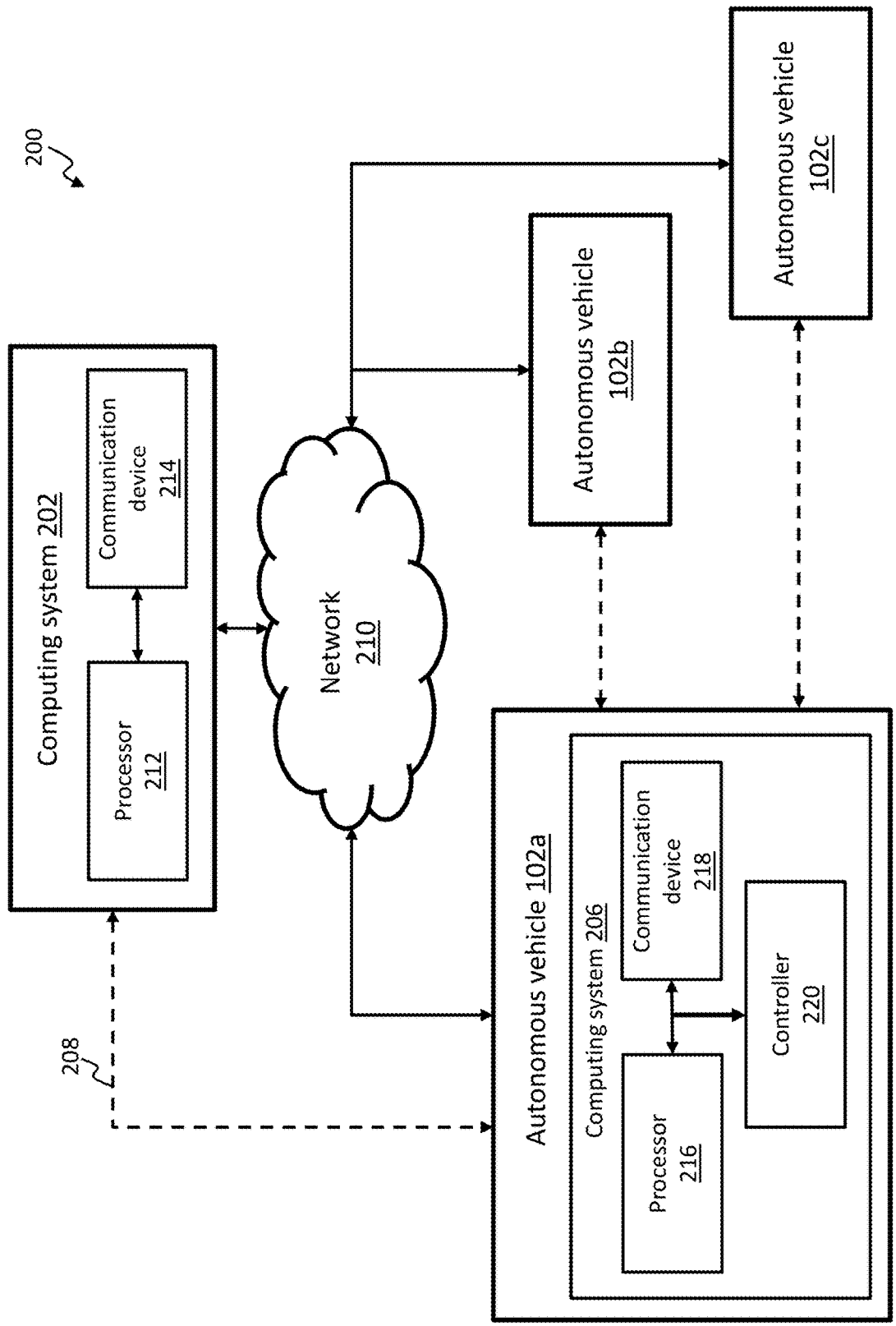
FIG. 2 is a diagram of an embodiment of a system for managing exceptions to orders collected by autonomous vehicles.

FIG. 2 illustrates a system 200 configured to manage exceptions to orders. The system 200 may include a remote computing system 202 configured to be coupled directly or indirectly to one or more autonomous vehicles 102a, 102b, 102c (collectively referred to as 102). For instance, the remote computing system 202 may communicate directly with the computing system 206 of an autonomous vehicle 102 (e.g., via communication channel 208). Additionally or alternatively, the remote computing system 202 can communicate with one or more autonomous vehicles 102 via a network device of network 210. In some embodiments, the remote computing system 202 may communicate with a first autonomous vehicle (e.g., vehicle 102a) via a second autonomous vehicle (e.g., vehicle 102b).

The exemplary remote computing system 202 may include a processor 212 coupled to a communication device 214 configured to receive and transmit messages and/or instructions. The exemplary vehicle computing system 206 may include a processor 216 coupled to a communication device 218 and a controller 220. The vehicle communication device 218 may be coupled to the remote communication device 214. The vehicle processor 216 may be configured to process signals from the remote communication device 214 and/or vehicle communication device 218. The controller 220 may be configured to send control signals to a navigation system and/or other components of the vehicle 102, as described further herein.

As discussed herein and unless otherwise specified, the term "computing system" may refer to the remote computing system 202 and/or the vehicle computing system 206. The computing system(s) may receive and/or obtain information about a customer order (e.g., from another computing system or via a network), including the list of items, the priority of the order relative to other orders, the target shipping date, whether the order can be shipped incomplete (without all of the ordered items) and/or in multiple shipments, etc. A processor (e.g., of system 202 and/or of system 206) may process the customer order to determine an optimal path for one or more autonomous vehicles 102 to collect items in a "picklist" for the order. For example, a picklist of items may be assigned to a single vehicle or to two or more vehicles 102.

The determined path may be transmitted to the controller 220 of the vehicle 102. The controller 220 may navigate the vehicle 102 in an optimized sequence of stops (also referred to as a trip) within the warehouse to collect the items. At a given stop, a worker near the vehicle 102 may physically place the item into a container 108 for the vehicle 102 to carry. Alternatively or additionally, the autonomous vehicle 102 may include an apparatus (e.g., a robotic arm) configured to collect items into a container 108.

Figure 3:
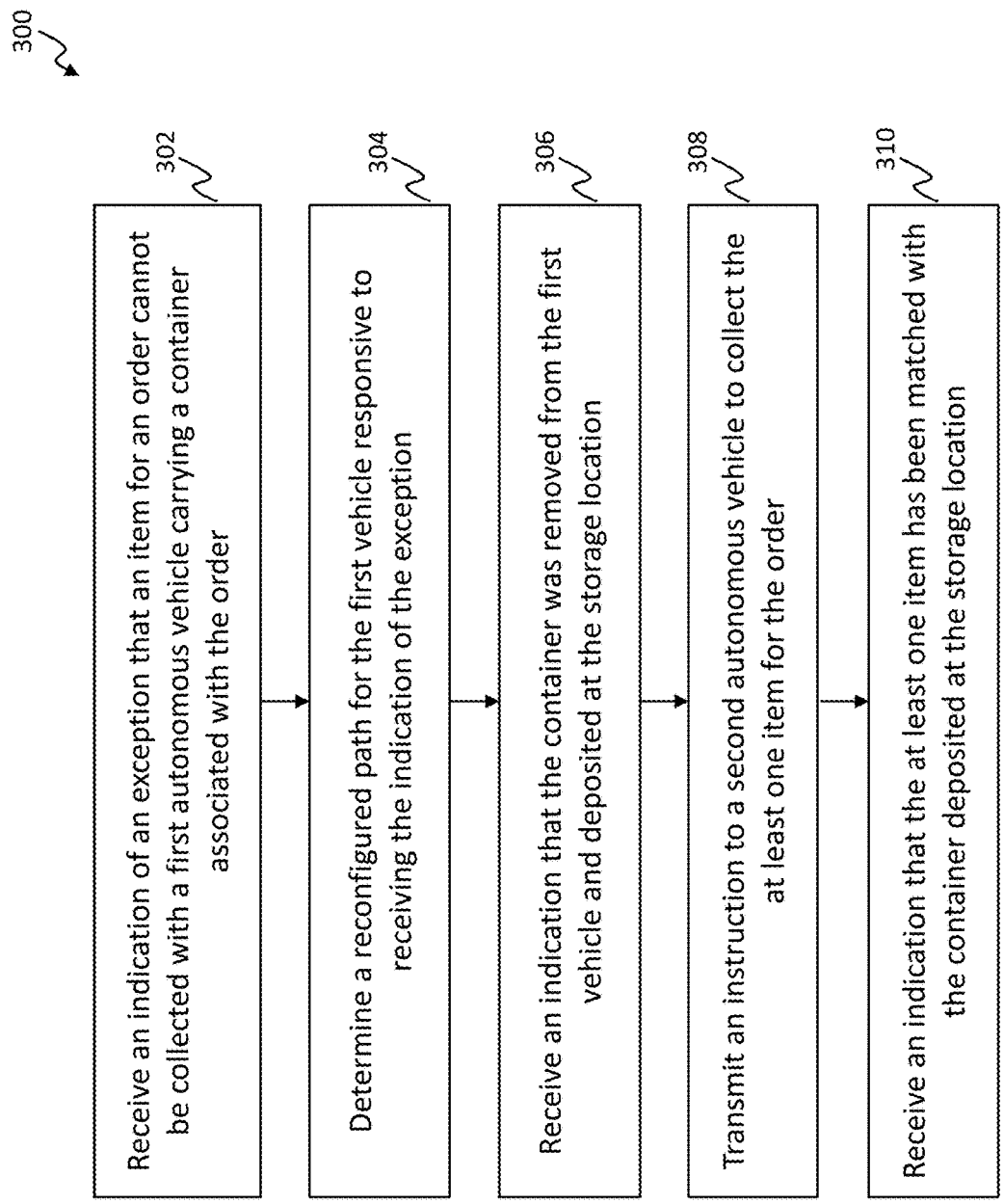
FIG. 3 is a flowchart of an embodiment of a method for managing exceptions to orders with autonomous vehicles.
Figure 4A:
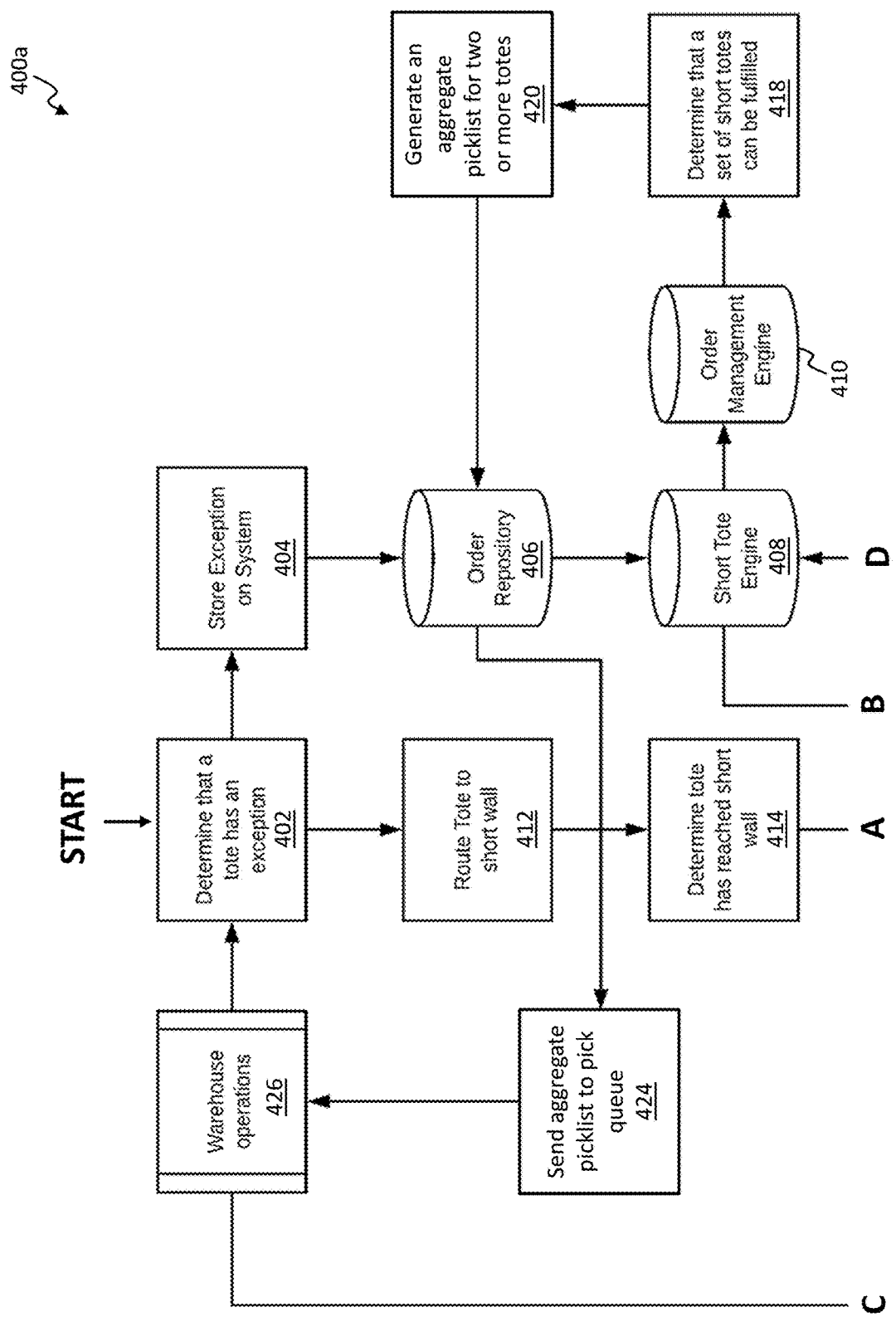
FIGS. 4A-4B is a diagram of an embodiment of a workflow for managing exceptions to orders with autonomous vehicles.
Figure 4B:
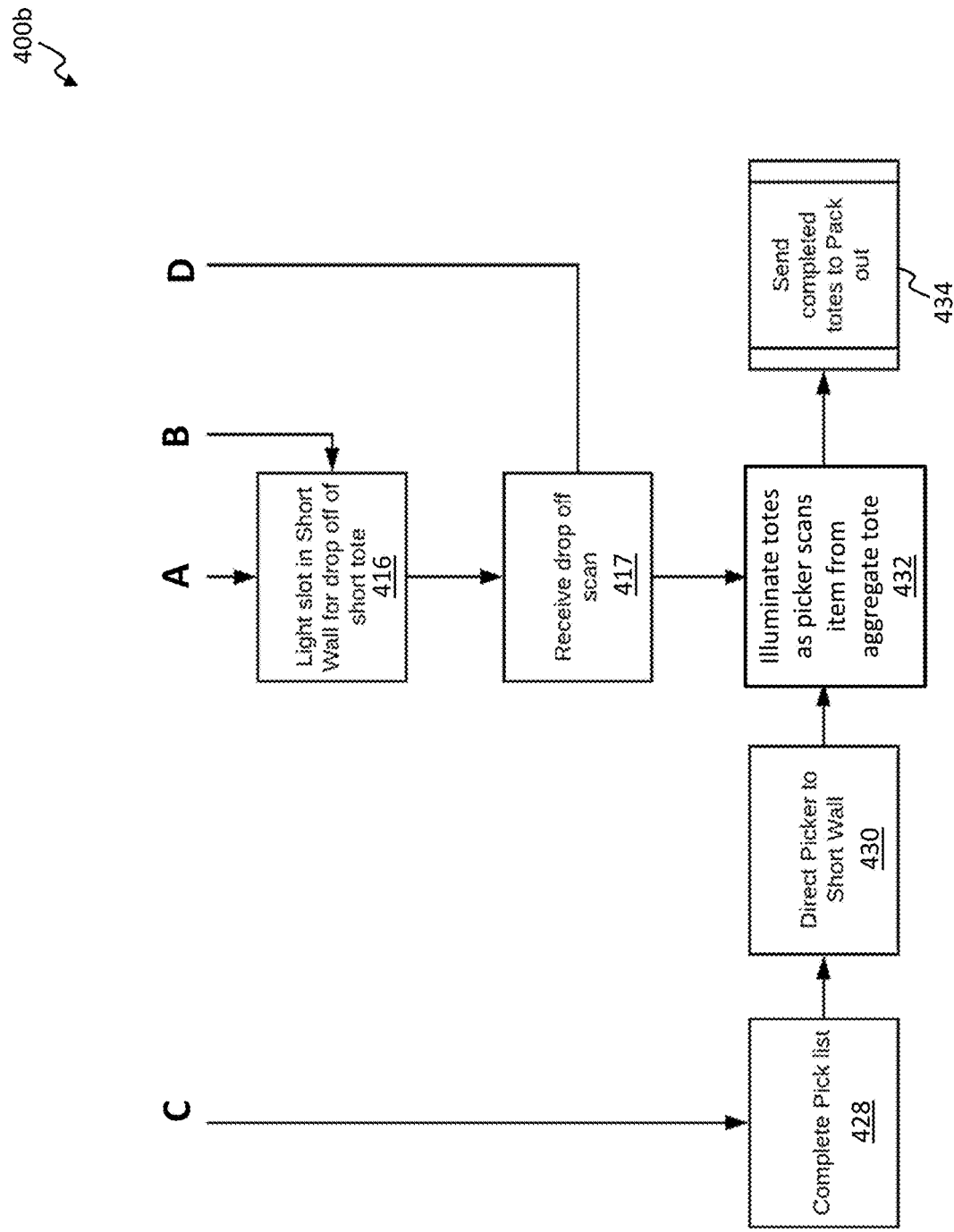
Figure 5:
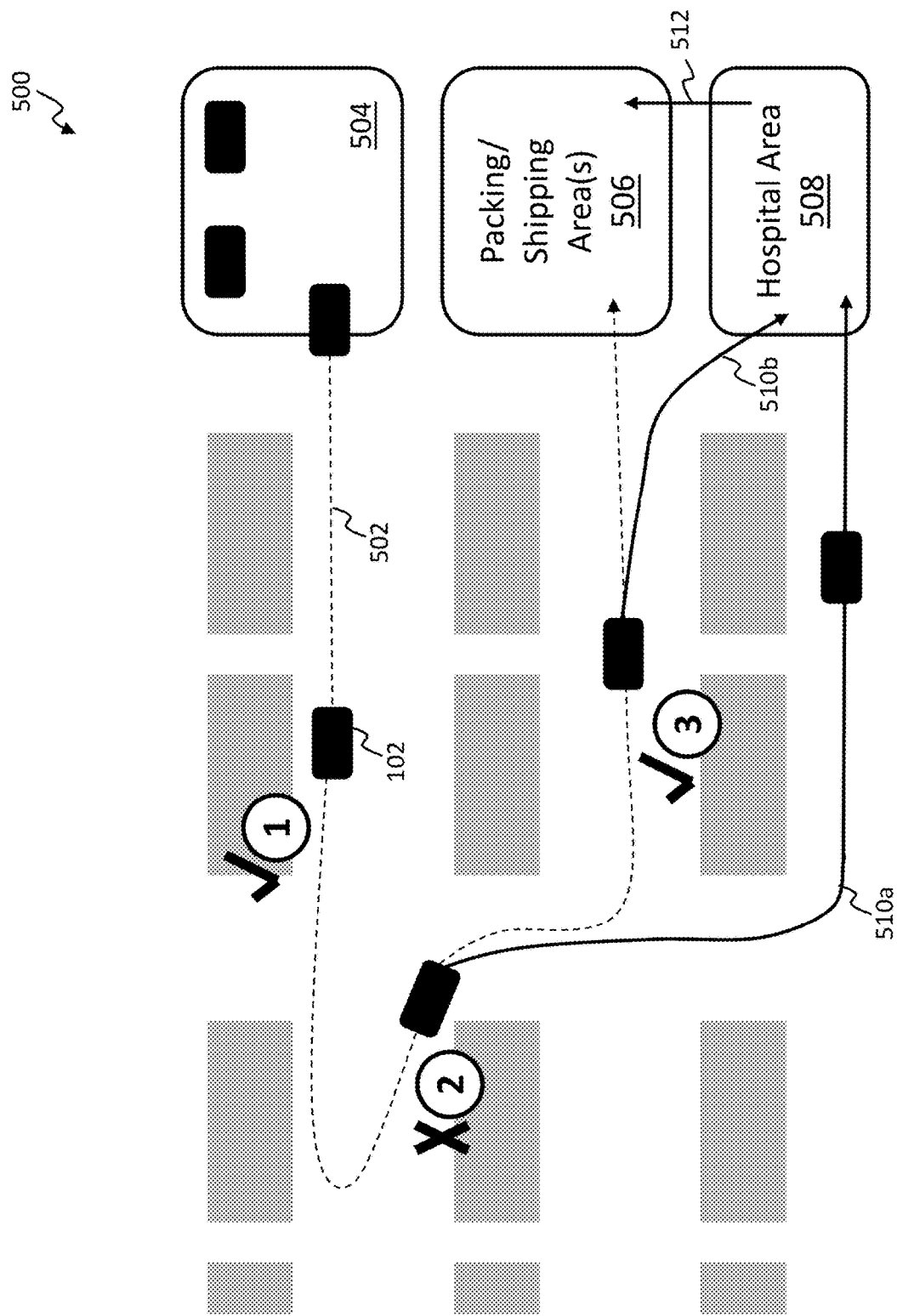
FIG. 5 is a diagram of an embodiment of a warehouse configuration in which one or more autonomous vehicles are employed to manage exceptions to orders.

FIG. 3 is a flowchart of an exemplary method 300 for managing exceptions to orders with autonomous vehicles. FIGS. 4A-4B illustrate a workflow 400a, 400b (collectively referred to as 400) for managing exceptions. FIG. 5 illustrates an exemplary warehouse configuration 500 in which one or more autonomous vehicles 102 are employed to manage exceptions to orders. For the sake of clarity and conciseness, FIGS. 3-5 are discussed together herein.

In step 302 of method 300, a computing system may receive an indication (e.g., a signal, a notification, a message, etc.) of an exception that an item for an order cannot be collected with an autonomous vehicle 102 that is carrying the container 108 associated with the customer order. The computing system may receive this indication from another computing system, an inventory system, another autonomous vehicle 102 (e.g., a vehicle that has already attempted to pick an item of the same item type as the item causing the exception), an input from a human worker (e.g., via a user interface), a sensor on the vehicle 102, etc.

In some embodiments, an exception may be detected during a trip, for example, when the location for an item is missing the item, the item is damaged, the item is too large for the container 108, etc. In some embodiments, the exception may be detected prior to the trip of the particular autonomous vehicle 102. For example, the computing system may receive a signal from an inventory system that the item will be out of stock at its assigned location. In another example, the computing system may receive a signal from the computing system of an autonomous vehicle that has previously attempted to pick the same item that the stocked items are damaged. In another example, the computing system may receive information that the item is too large for the size of container 108 of the particular autonomous vehicle 102. For example, the computing system may receive a request signal for a larger container 108 or a container 108 having a different shape. In some cases, the vehicle 102 may obtain an appropriately sized or shaped container. In other cases, the computing system may send a signal to a second vehicle to deliver the appropriately sized or shaped container to the vehicle attempting to collect the item.

Referring to workflow 400, in some embodiments, in workflow process 402, a processor of the computing system may determine or derive that a particular container 108 is associated with an exception. For example, if a sensor (e.g., a weight sensor, a camera, etc.) of a first autonomous vehicle (e.g., vehicle 102a) on a first trip detects that the item is not inside its container 108, the processor coupled to the sensor may determine that an exception is associated with that container.

In some embodiments, in workflow process 404, the exception may be stored in a database of or coupled to the computing system. For example, the database can include an order repository 406 configured to store data related to customer orders (e.g., entered from a web portal or other database). The order repository 406 may be coupled to an engine 408 for handling containers associated with exceptions (referred to as shorted totes). The order repository 406 and/or the short tote engine 408 may be coupled to an order management engine 410 configured to manage customer orders.

In method step 304, the computing system can determine a reconfigured path for the autonomous vehicle responsive to receiving the indication of the exception. In particular, the original path of the autonomous vehicle 102 can be reconfigured to manage the exception. For example, the processor 212 of the remote computing system 202 may determine the reconfigured path, relay the reconfigured path information to the communication device 214, which can send the reconfigured path information to the autonomous vehicle 102a. The communication device 218 of the autonomous vehicle 102a may receive the reconfigured path information and transmit it to the processor 216 and/or controller 220 for navigating the vehicle 102a according to the reconfigured path. In another example, the processor 216 of the particular vehicle 102a may determine the reconfigured path for itself and transmit the path information to the coupled controller 220.

Referring to FIG. 5, the original path 502 (depicted in a dashed line) of the vehicle 102 may take the vehicle 102 from a docking area 504 (e.g., charging area, parking lot, etc.) to one or more stops (e.g., stop 1, stop 2, etc.) throughout an inventory area (e.g., warehouse, grocery store, retail store, etc.) to collect items in the container 108, and may typically end at a packing and/or shipping area 506.

In some embodiments, in workflow process 412, upon or after receiving an exception associated with an order (e.g., after picking additional items for the order), the vehicle 102 can be re-routed to a hospital area 508 (also referred to as an exception area, a storage location, or a drop-off location) via a reconfigured path 510. In some embodiments, the hospital area 508 may be the same as, different from, or adjacent to the location 506 used for packing and/or shipping completed orders of items. The hospital area 508 may be configured to store containers 108 associated with exceptions (also referred to as shorted containers or totes). Note that, in some embodiments, there may be two or more hospital areas 508 in a particular warehouse. For example, the item at stop 1 may be available for pick-up but the item at stop 2 may have a damaged barcode and therefore may result in an exception. Upon or after receiving the exception, the vehicle 102 may be re-routed to the hospital area 508.

In some cases, the computing system may transmit the pre-determined reconfigured path 510 to the vehicle 102 before or during its trip on the original path 502 in anticipation of an exception. In one or more embodiments, the computing system (e.g., system 202 and/or system 206) may determine one or more reconfigured paths 510a, 510b (e.g., referred collectively as 510) based on the items in the picklist assigned to the vehicle 102. For example, if the picklist has three (3) items, each assigned to its own stop on the original path 502 of the vehicle 102, the computing system may pre-determine a reconfigured path 510a from the stop associated with the exception (e.g., stop 2) on the original path 502. In some embodiments, the vehicle 102 does not necessarily have to deviate from its original path 502 upon receiving an exception for a particular item. For example, the vehicle 102 may continue to collect the rest of the items on the order (e.g., continue to stop 3 on its original path 502) and then travel to the hospital area 508 via reconfigured path 510b. This can ensure that the order is as complete as possible while the exception is addressed.

In method step 306, the computing system may receive an indication that the container 108 was removed from the autonomous vehicle 102 and deposited at the storage location 508. In some embodiments, there may be a human worker that moves the shorted container to a position in the hospital area 508. In other embodiments, there may be a mechanical apparatus (e.g., a robotic arm, a pulley system, a hydraulic lift, etc.) coupled to the autonomous vehicle 102 and/or in the hospital area 508 configured to move the shorted container. In some embodiments, the indication may be a signal from a sensor (e.g., weight sensor, optical sensor, etc.) that the contained 108 was removed from the vehicle 102. In some embodiments, the indication may be based on an inference that the container 108 was removed once the vehicle's path is complete, once the vehicle returns to the charging area, once the order is shipped, etc. In workflow process 414, the computing system may receive an indication and/or determine that the vehicle 102 with the shorted container has arrived at the hospital area 508. In some embodiments, the hospital area 508 may include one or more sensors (e.g., in communication with the computing system) configured to determine whether an autonomous vehicle 102 has entered the hospital area 508.

The hospital area 508 may take the form of a physical space including a wall, a rack, or a set of positions including slots for shorted containers. In some embodiments, the positions for containers in the hospital area 508 can include a sensor configured to sense whether a container is disposed in the particular position. The position may include one or more lights (e.g., LEDs, conventional light bulbs, etc.) configured to illuminate the position. For example, in workflow process 416, the light can illuminate a position for the shorted container to be placed (e.g., by a human worker, robotic arm, etc.). In workflow process 417, the computing system may receive a signal (e.g., a scan of the container) indicating that the shorted container has been deposited in a particular position in the location 508. In another example, the light can illuminate the position of a container that may be ready for shipping (e.g., having a resolved exception), as described further below.

In some cases, the items associated with the shorted container may be removed from the container 108 itself and placed in a different receptacle or slot in the hospital area 508. In some embodiments, the items collected toward completing the order can be stored for a period of time until the remaining item(s) (associated with the exception) can complete the order. For example, once obtained, the remaining item(s) can be added to the stored shorted container to complete the order. Note that, in some instances, an order may not be able to be completed with the desired amount of time and may be cancelled or modified. In the instance of a cancelled order, the picked items at the hospital area 508 may be re-shelved from the hospital area 508 back into inventory (e.g., to a location within the warehouse). Alternatively, the order could be fulfilled in part by shipping the picked items in the hospital area 508 (e.g., if permitted by the business process of a given facility or merchant). In such a case, the partial order may be delivered to the packing/shipping area 506 from the hospital area 508 via path 512 (e.g., by conveyor or autonomous vehicle 102).

Systems and Methods for Managing Exceptions—Completing Orders

In various embodiments, in workflow process 418, the computing system may receive an indication and/or determine that shorted orders can be fulfilled. For example, the order management engine 410 may receive a signal from an inventory management system that the item is back in stock, that the damaged barcode of the item has been fixed, etc. For example, the signal may indicate that the inventory count of an inventory record for the item may be increased. Once the outstanding item(s) for an order can be resolved (e.g., picked to complete an order), these outstanding items can be organized into a different workflow or integrated into an existing workflow. For example, the hospital area 508 may include two or more shorted containers. In some embodiments, in workflow process 420, the computing system may organize and/or batch the outstanding items from at least two of these shorted containers together to generate a new picklist (also referred to as an aggregate picklist). For example, the instruction may be inputted to the order repository 406, which can generate the aggregate picklist. In some embodiments, the aggregate picklist may be organized based on the priority of shorted customer orders. For example, the items for shorted orders with the highest priority may be batched together and treated before items of lower priorities. By doing so, any special handling or other resource-heavy process can be prevented or minimized.

In workflow process 424, the computing system may transmit the aggregate picklist from the order repository to a system or process 426 (which may be referred to as warehouse operations in a warehouse context) for managing pick queues (e.g., a queue for picking items for orders by vehicles 102 at the docking area 504). The system of process 426 for managing pick queues may be part of the computing system(s). The computing system may assign the new picklist to an autonomous vehicle 102 (e.g., in a pick queue), which may pick the items in the new picklist in the same or similar manner as picklists for other customer orders. In some instances, the new picklist can be configured to account for higher priority items or items that can easily be picked for greater efficiency. For example, the new picklist can include items grouped in a particular zone, on a particular route, or of a particular size for efficient collection.

In method step 308, the computing system can transmit an instruction, directly or indirectly, to the computing system of an autonomous vehicle 102 to collect the remaining item(s) for one or more shorted containers. The instruction may include the aggregate picklist and/or a path for the autonomous vehicle 102 to collect one or more remaining items. Note that the autonomous vehicle 102 assigned to collect the remaining item(s) may be the same or different vehicle from the original vehicle that carried the shorted container.

In workflow process 428, once some or all of the remaining items are collected, the vehicle 102 carrying the remaining items can be routed to the hospital area 508 to complete one or more of the shorted containers. As described above, a sensor of the storage location 508 may determine that the vehicle 102 has entered the location 508. Additionally or alternatively, the vehicle computing system 206 of the vehicle 102 may communicate with the remote computing system 202 to indicate that vehicle 102 has arrived with the remaining item(s) for one or more shorted orders held at the hospital area 508.

In some embodiments, in workflow process 430, a human worker may be directed to combine the remaining item(s) with the items of the shorted order or container stored at the hospital area 508. In other embodiments, an automated device (e.g., a robotic arm) may be configured to combine items with shorted orders. In workflow process 432, as each remaining item(s) are scanned, the positions of the shorted containers may be illuminated to indicate the position of the particular shorted container. For example, a first item from the container holding the aggregate picked items may be scanned and a first LED indicating the position of a first container may be illuminated so that the first item may be combined with the items of the first container. A second item from the aggregate container may be scanned and a second LED indicating the position of the first container or a second container may be illuminated so that the second item may be combined with the items of the first or second containers, and so on.

In method step 310, the computing system can receive an indication that the remaining item(s) associated with exception has been matched with the shorted container at the hospital area 508. Once a shorted container is completed, in workflow process 434, an autonomous vehicle 102 can be routed to move the completed container to another area for packing (e.g., for delivery via path 512). Alternatively, the completed container may be moved by another manner (e.g., by a conveyor belt or other automated process) for packing.

Systems and Methods for Managing Exceptions—Additional Embodiments

In some embodiments, the shorted containers may be deposited by autonomous vehicle near the location where the exception occurs. For example, if an item is missing from a particular location on the original route 502 of a first autonomous vehicle 102a, that first vehicle may deposit the incomplete container at that particular location (e.g., stop 2) and continue to pick items for other orders. The computing system may send a signal to a second vehicle 102b to the location (e.g., stop 2) with a path to the hospital area 508 at a different time. The computing system may dynamically determine paths for one or more vehicles 102 in the warehouse based on the locations of the shorted containers throughout the inventory area (e.g., warehouse floor).

Such a system can enable the first vehicle 102a to continue addressing orders that can be completed in parallel with managing exceptions with a second vehicle 102b. In some cases, this method may reduce the time of vehicles with inactive or unresolvable containers, thereby maintaining overall efficiency and productivity in the system.

Figure 6:
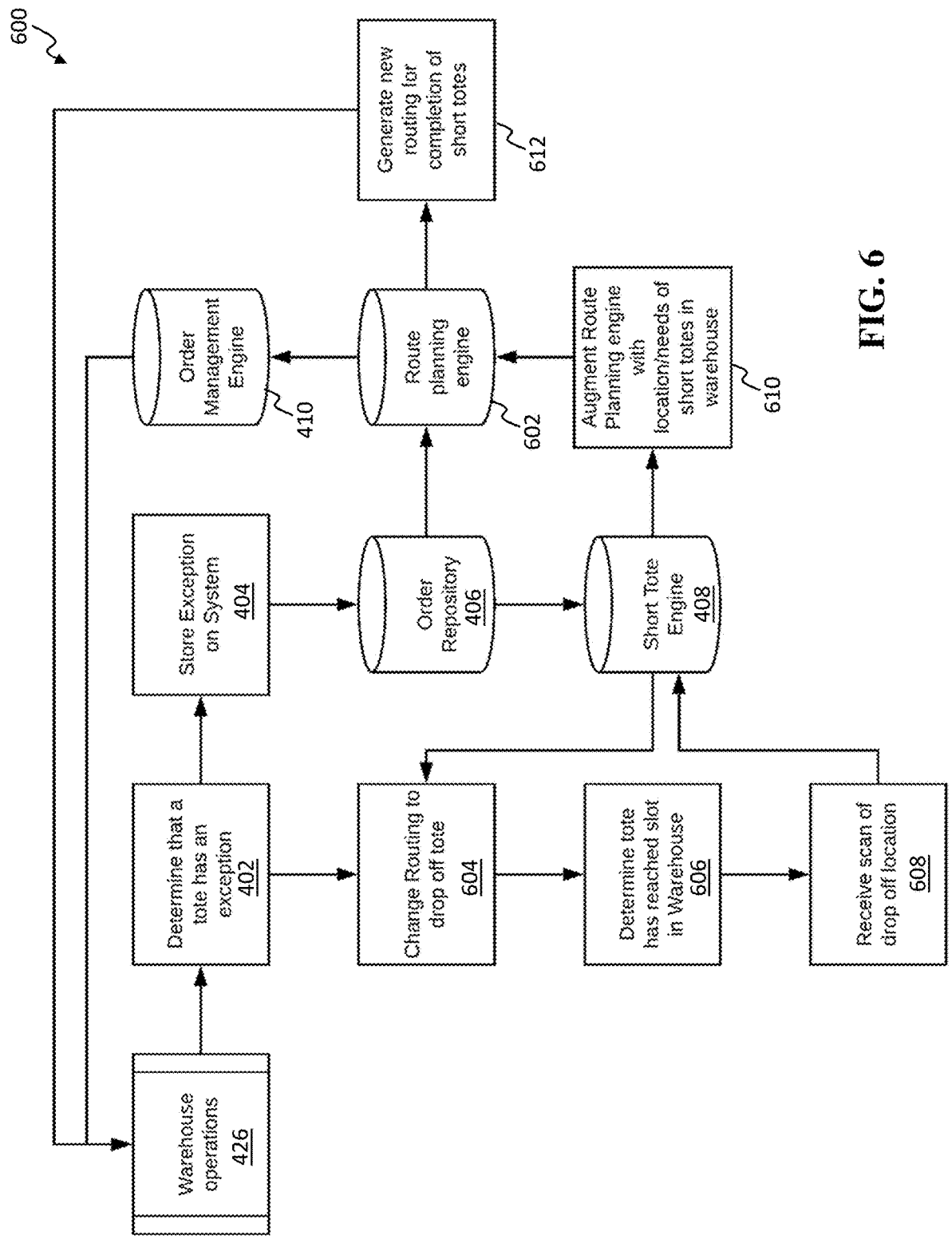
FIG. 6 is a diagram of an embodiment of a workflow for managing exceptions to orders with autonomous vehicles.

FIG. 6 illustrates a workflow 600 of an exemplary system and method for managing exceptions. Note that processes in workflow 600 with shared reference numbers of the processes in workflow 400 have the same or similar functions. In workflow process 402, a computer system can receive an indication and/or determine that the container is associated with an exception. In workflow process 404, the computer system may store the exception in a database, e.g., an order repository 406 configured to store information about customer orders. The exception and/or order information may be transmitted to the shorted container engine 408 (also referred as the short tote engine) and/or to the route planning engine 602. The route planning engine 602 may be configured to determine one or more paths an autonomous vehicle 102 can take from a given initial position to collect one or more items on a picklist. The route planning engine 602 may be configured to determine one or more alternative routes (e.g., due to traffic, obstacles, pre-determine exceptions, etc.). The route planning engine 602 may interface with the order management engine 410.

In some embodiments, the computing system determines that an exception has occurred for the particular container 108 (shorted container) carried by the autonomous vehicle 102, as discussed in greater detail above. Referring to workflow process 604, the computing system may transmit a reconfigured path to the autonomous vehicle 102 to drop off the shorted container in a designated area. For instance, the shorted container may be deposited near where the exception occurred or at a designated position for the particular aisle or zone the exception occurred. For instance, each set of warehouse racks (e.g., bays, shelving units, pallets, etc.) may have a designated area for shorted containers related to that particular warehouse rack.

In workflow process 606, the computing system may receive an indication and/or determine that the shorted container has been deposited in the designated area near the exception. For example, the designated area in a warehouse rack may include one or more sensors coupled to the network 210 and configured to transmit a signal to the computing system 202 (e.g., via a communication device 214) that the shorted container is in a designated area. In workflow process 608, the computing system may receive a signal (e.g., a scan) indicating the location of the designated area where the shorted container is stored.

Information related to the location of a shorted container and/or the outstanding items may be provided to the shorted container engine 408. In workflow process 610, the shorted container engine 408 may transmit the information to the route planning engine 602. In workflow process 612, the route planning engine 602 may generate a new route for an autonomous vehicle to address the exception. For instance, the route planning engine 602 can receive an indication from the order repository 406 that inventory count of one or more items associated with exceptions has increased. Based on this information, the route planning engine can generate a route for a vehicle to complete one or more shorted containers. This route information may be transmitted to the warehouse operations process 426, which may assign picklists to vehicles 102.

Computer-Based Implementations

In some examples, some or all of the processing described above can be carried out on a personal computing device, on one or more centralized computing devices, or via cloud-based processing by one or more servers. In some examples, some types of processing occur on one device and other types of processing occur on another device. In some examples, some or all of the data described above can be stored on a personal computing device, in data storage hosted on one or more centralized computing devices, or via cloud-based storage. In some examples, some data are stored in one location and other data are stored in another location. In some examples, quantum computing can be used. In some examples, functional programming languages can be used. In some examples, electrical memory, such as flash-based memory, can be used.

Figure 7:
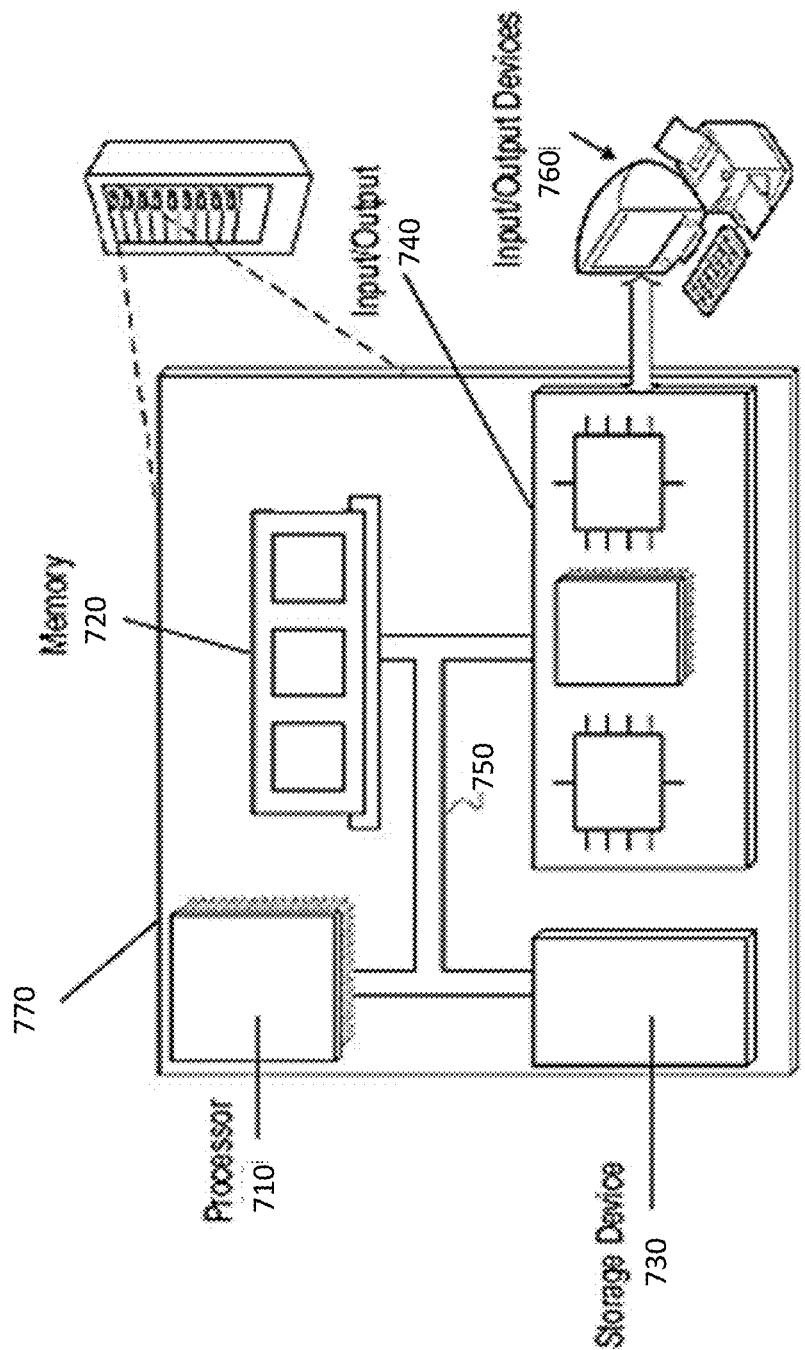
FIG. 7 is a block diagram of an embodiment of a computer system used in implementing the systems and methods described herein.

FIG. 7 is a block diagram of an example computer system 700 that may be used in implementing the systems and methods described herein. General-purpose computers, network appliances, mobile devices, or other electronic systems may also include at least portions of the system 700. The system 700 includes a processor 710, a memory 720, a storage device 730, and an input/output device 740. Each of the components 710, 720, 730, and 740 may be interconnected, for example, using a system bus 750. The processor 710 is capable of processing instructions for execution within the system 700. In some implementations, the processor 710 is a single-threaded processor. In some implementations, the processor 710 is a multi-threaded processor. The processor 710 is capable of processing instructions stored in the memory 720 or on the storage device 730.

The memory 720 stores information within the system 700. In some implementations, the memory 720 is a non-transitory computer-readable medium. In some implementations, the memory 720 is a volatile memory unit. In some implementations, the memory 720 is a nonvolatile memory unit.

The storage device 730 is capable of providing mass storage for the system 700. In some implementations, the storage device 730 is a non-transitory computer-readable medium. In various different implementations, the storage device 730 may include, for example, a hard disk device, an optical disk device, a solid-date drive, a flash drive, or some other large capacity storage device. For example, the storage device may store long-term data (e.g., database data, file system data, etc.). The input/output device 740 provides input/output operations for the system 700. In some implementations, the input/output device 740 may include one or more of a network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 760. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 730 may be implemented in a distributed way over a network, such as a server farm or a set of widely distributed servers, or may be implemented in a single computing device.

Although an example processing system has been described in FIG. 7, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array) or an ASIC (application specific integrated circuit). A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A computing system for managing exceptions to orders collected with autonomous vehicles, the computing system comprising:
    a communication device to receive signals output by a first autonomous vehicle, the first autonomous vehicle carrying a container associated with an order; and
    a processor in electrical communication with the communication device, the processor to:
        detect, based on the signals output by the first autonomous vehicle, an exception indicating that at least one item for the order is not carried by the first autonomous vehicle; and
        determine a reconfigured path for the first autonomous vehicle in response to detection of the exception, the reconfigured path including a stop at a storage location configured to store containers associated with the exception, the communication device to:
        receive signals indicating that the container was removed from the first autonomous vehicle and deposited at the storage location;
        transmit signals to a second autonomous vehicle to cause the second autonomous vehicle to (i) collect the at least one item for the order and (ii) navigate to the storage location such that the at least one item is matched with the container; and
    receive, via a network, signals indicating that the at least one item has been matched with the container deposited at the storage location.

2. The computing system of claim 1, wherein the order is a first order, the exception is a first exception, and the communication device is to receive signals output by a third autonomous vehicle, the third autonomous vehicle associated with a second order, and
    the processor is to detect, based on the signals output by the third autonomous vehicle, a second exception indicating that at least one item for the second order is not carried by the third autonomous vehicle.

3. The computing system of claim 2, wherein the communication device is to transmit signals to the second autonomous vehicle to cause the second autonomous vehicle to collect the at least one item for the second order.

4. The computing system of claim 1, wherein the exception is a first exception and the processor is to detect a second exception, the second exception including at least one of: (i) an indication that the at least one item is not present at a location assigned to the item; (ii) an indication that at least one other item for the order is damaged; (iii) an indication that at least one other item for the order has an unscannable barcode; (iv) an indication that the container lacks space to hold the at least one item; (v) an indication that the at least one item is located on a different floor from the first autonomous vehicle; or (vi) an indication that the first autonomous vehicle cannot obtain the at least one item.

5. The computing system of claim 1, wherein the communication device is to receive the signals output by the first autonomous vehicle via (i) a user interface coupled to the first autonomous vehicle, (ii) a sensor of the first autonomous vehicle, (iii) a computing system of the first autonomous vehicle, or (iv) a computing system remote from the first autonomous vehicle.

6. The computing system of claim 1, wherein the communication device is to (i) receive the signals indicating that the container was removed from the first autonomous vehicle and deposited at the storage location at a first time and (ii) transmit the signals to the second autonomous vehicle to collect the at least one item for the order at a second time different from the first time.

7. The computing system of claim 6, wherein the processor is to determine that the at least one item for the order can be collected, the communication device to transmit the signals to the second autonomous vehicle to collect the at least one item for the order at the second time occurring after the determination that the at least one item for the order can be collected.

8. The computing system of claim 1, wherein the computing system is remote from the first and second autonomous vehicles.

9. The computing system of claim 1, wherein the storage location includes lighting for facilitating the matching of the at least one item with the container deposited at the storage location.

10. The computing system of claim 1, wherein the communication device is to:
    receive signals indicating that an inventory count for the at least one item has increased; and
    transmit the signals to the second autonomous vehicle to cause the second autonomous vehicle to collect the at least one item for the order in response to the signals indicating that the inventory count for the at least one item has increased.

11. A computer-implemented method for managing exceptions to orders collected with autonomous vehicles, the method comprising:
    receiving, by a communication device of a computing system, signals output by a first autonomous vehicle, the first autonomous vehicle carrying a container associated with an order;
    detecting, by a processor of the computing system based on the signals output by the first autonomous vehicle, an exception indicating that at least one item for the order is not carried by the first autonomous vehicle;
    determining, by the processor of the computing system, a reconfigured path for the first autonomous vehicle in response to detecting the exception, the reconfigured path including a stop at a storage location configured to store containers associated with the exception;
    receiving, by the communication device, signals indicating that the container was removed from the first autonomous vehicle and deposited at the storage location;

transmitting, by the communication device, signals to a second autonomous vehicle to cause the second autonomous vehicle to (i) collect the at least one item for the order and (ii) navigate to the storage location such that the at least one item is matched with the container; and receiving, by the communication device, signals indicating that the at least one item has been matched with the container deposited at the storage location.

12. The method of claim 11, wherein the order is a first order, the exception is a first exception, and further including:

receiving signals output by a third autonomous vehicle, the third autonomous vehicles associated with a second order; and detecting, based on the signals output by the third autonomous vehicle, a second exception indicating that at least one item for the second order is not carried by the third autonomous vehicle.

13. The method of claim 12, further including transmitting signals to the second autonomous vehicle to collect the at least one item for the second order.

14. The method of claim 11, wherein the exception is a first exception and further including detecting a second exception, the second exception including at least one of: (i) an indication that the at least one item is not present at a location assigned to the item; (ii) an indication that at least one other item for the order is damaged; (iii) an indication that at least one other item for the order has an unscannable barcode; (iv) an indication that the container lacks space to hold the at least one item; (v) an indication that the at least one item is located on a different floor from the first autonomous vehicle; or (vi) an indication that the first autonomous vehicle cannot obtain the at least one item.

15. The method of claim 11, wherein the receiving of the signals output by the first autonomous vehicle is via (i) a user interface coupled to the first autonomous vehicle, (ii) a sensor of the first autonomous vehicle, (iii) a computing system of the first autonomous vehicle, or (iv) a computing system remote from the first autonomous vehicle.

16. The method of claim 11, wherein the receiving of the signals indicating that the container was removed from the first autonomous vehicle and deposited at the storage location occurs at a first time and the transmitting of the signals to the second autonomous vehicle to collect the at least one item for the order occurs at a second time different from the first time.

17. The method of claim 16, further including determining that the at least one item for the order can be collected, the transmitting of the signals to the second autonomous vehicle to collect the at least one item for the order at the second time occurring after determining that the at least one item for the order can be collected.

18. The method of claim 11, wherein the method is executed by a computing system remote from the first and second autonomous vehicles.

19. The method of claim 11, further including:

receiving signals indicating that an inventory count for the at least one item has increased; and transmitting the signals to the second autonomous vehicle to collect the at least one item for the order in response to the signals indicating that the inventory count for the at least one item has increased.

20. A non-transitory computer-readable medium having instructions stored thereon that, when executed by one or more computer processors, cause the computer processors to perform operations comprising:

receiving signals output by a first autonomous vehicle, the first autonomous vehicle carrying a container associated with an order;

detecting, based on the signals output by the first autonomous vehicle, an exception indicating that at least one item for the order is not carried by the first autonomous vehicle;

determining a reconfigured path for the first autonomous vehicle in response to detecting the exception, the reconfigured path including a stop at a storage location configured to store containers associated with the exception;

receiving signals indicating that the container was removed from the first autonomous vehicle and deposited at the storage location;

transmitting signals to a second autonomous vehicle to cause the second autonomous vehicle to (i) collect the at least one item for the order and (ii) navigate to the storage location such that the at least one item is matched with the container; and receiving signals indicating that the at least one item has been matched with the container deposited at the storage location.

* * * * *